US006176938B1

(12) United States Patent
Palmer

(10) Patent No.: US 6,176,938 B1
(45) Date of Patent: Jan. 23, 2001

(54) APPARATUS AND METHOD FOR REMOVING MATERIAL FROM PIPELINES

(75) Inventor: Thomas Palmer, Nottingham (GB)

(73) Assignee: Hygienic Pigging Systems Limited (GB)

(*) Notice: Under 35 U.S.C. 154(b), the term of this patent shall be extended for 0 days.

(21) Appl. No.: 09/007,639

(22) Filed: Jan. 15, 1998

(30) Foreign Application Priority Data

Jan. 17, 1997 (GB) .................................................. 9700936

(51) Int. Cl.⁷ ...................................................... B08B 9/04
(52) U.S. Cl. ........................ 134/8; 134/22.11; 15/104.61
(58) Field of Search ........................ 134/8, 22.11, 22.12; 15/104.061, 3.5

(56) References Cited

U.S. PATENT DOCUMENTS

| | | | | |
|---|---|---|---|---|
| 3,011,197 | * | 12/1961 | Nehse et al. ................. | 15/104.061 |
| 3,384,512 | * | 5/1968 | Fredrick et al. .................... | 134/8 |
| 3,543,323 | * | 12/1970 | Girard ........................ | 15/104.061 |
| 3,546,642 | * | 12/1970 | Fredrick et al. .................... | 134/8 |
| 3,875,606 | | 4/1975 | Landers ...................... | 15/104.061 |
| 3,879,790 | | 4/1975 | Girard ......................... | 15/104.06 |
| 4,083,076 | * | 4/1978 | Girard ......................... | 15/104.061 |
| 4,416,703 | * | 11/1983 | Scott .................................. | 134/8 |
| 5,032,185 | * | 7/1991 | Knapp .......................... | 15/104.061 |
| 5,389,155 | * | 2/1995 | Lima .................................. | 134/8 |

FOREIGN PATENT DOCUMENTS

| | | |
|---|---|---|
| 30 32 532 | 8/1980 | (DE) . |
| 91 11 600 U | 9/1991 | (DE) . |
| 195 13 104 | 4/1995 | (DE) . |
| 392512 | 8/1931 | (GB) . |
| 483941 | 4/1938 | (GB) . |
| 1444496 | 7/1976 | (GB) . |

* cited by examiner

Primary Examiner—Randy Gulakowski
Assistant Examiner—Saeed Chaudhry
(74) Attorney, Agent, or Firm—Watts Hoffmann Fisher & Heinke Co LPA

(57) ABSTRACT

A pipeline evacuating device includes a first relatively rigid portion and a second relatively deformable portion. The deformable portion is arranged to be compressable against the rigid portion when the device is forced through a pipeline by the reaction of the material in the pipeline against the force of movement of the device. The compression causes the second portion to deform to at least substantially slidingly seal against the inside of the pipeline. Efficient evacuation of the material from the pipeline is provided as the device is forced therealong.

30 Claims, 2 Drawing Sheets

APPARATUS AND METHOD FOR REMOVING MATERIAL FROM PIPELINES

FIELD OF THE INVENTION

The present invention concerns the evacuation of pipelines and particularly but not exclusively to the cleaning of pipelines by removal of material from therewithin.

DESCRIPTION OF THE PRIOR ART

Pipelines are used to convey fluid materials in many industrial environments. The production of many liquid products especially on an industrial scale, including chemicals, foodstuffs, beverages, pharmaceuticals, oils, cosmetics to name but a few, involves conveying product and/or substrate/ingredients for the product along pipelines.

Often it is required to clean the inside of such pipelines or at least to remove most of the material from therewithin. Cleaning is important for example when a different material is to be conveyed through a pipeline and contamination must be avoided. In many situations it is imperative that the pipeline is emptied completely of one material before another material can be conveyed therealong. It is also often desirable to recover material remaining in a pipeline, for example after a production run, to mitigate problems of wastage. The term "evacuated" is used in this specification to refer to the removal of material from a pipeline, and particularly to the removal of all or substantially all product from a pipeline or section of pipeline.

One known method of evacuating pipelines is to force a device, often termed "a pig" through the pipeline under pressure from a propellant liquid or gas. Known pigs push material along a pipeline and out through a designated outlet in the pipeline, in many instances for collection for use or disposal. However, known designs of pig comprise a quite rigid and hard body. This means that the pig has to be diametrically significantly smaller than the inside diameter of a pipeline for it to be able to move around bends in the pipeline during use. Therefore with such known designs of pig, material is often left lining the inside of a pipeline thereby providing incomplete and often unsatisfactory evacuation of material.

SUMMARY OF THE INVENTION

It is therefore an object of the present invention to obviate or mitigate the aforesaid disadvantage of the prior art.

According to the present invention there is provided a pipeline evacuating device comprising a first relatively rigid portion and a second relatively deformable portion arranged to be compressable against the rigid portion when the device is forced through a pipeline containing material to be removed by the reaction of the material in the pipeline against the force of movement of the device, the compression causing the second portion to deform to at least substantially slidingly seal against the inside of the pipeline whereby to provide efficient evacuation of material from the pipeline as the device is forced therealong.

Preferably the second portion is resiliently deformable such that upon removal from pressurized conditions the pig returns to a non-compressed, relaxed condition. Preferably the second portion is arranged to be compressable to increase the relaxed width of the second portion in a direction generally perpendicular to the intended direction of movement of the device in use along a pipeline. Preferably the second portion is deformable desirably generally symmetrically, to form a seal, desirably in the form of a sealing collar, around the device to provide for substantially complete slidable sealing around the device in a pipeline. Preferably the force(s) exerted onto the pipeline by the second portion is/are greater than those exerted by the first portion. Preferably the second portion extends substantially across the width of the first portion, to provide for a sealing collar generally at one end of the first portion. Preferably the second, deformable portion is located on the one end which in use leads the device to provide for compression of the second portion between the fluid in the pipeline to be removed and the first rigid portion.

Preferably the device is generally elongate, and operable in the longitudinal direction. The device may taper at said one leading end but desirably comprises a surface generally perpendicular to the direction of movement of the device on which the reactive forces of the material act in use.

Preferably the first rigid portion is magnetic and/or magnetizable to facilitate detection of the location of the device in a pipeline. The rigid portion may comprise the same or similar material, desirably plastics material, as the second deformable portion, and with magnetic or magnetizable additive(s) therein which additive(s) may contribute to the relative rigidity of the first portion. The additive(s) may be metallic or metal compounds perhaps in powder and/or granular form. The first portion may be of greater diameter than the second portion when the device is in the relaxed condition.

Preferably the second portion is firmly attached to the first relatively rigid portion, and may be fused, and/or chemically bonded, thereto.

The first and second portions may be encased in a flexible outer sheath which sheath is preferably relative tough to provide protection of the first and second portions.

The device may comprise a further deformable portion which further portion is desirably arranged to be compressable along with the said deformable portion to provide a second slidable seal. Preferably the further second portion is provided at the other, rear end of the device to be deformable through compression between the means providing the force for movement of the device and the relatively rigid portion. Preferably the further second portion is similar to the said first second portion. The device may be generally symmetrical and preferably bidirectionally operable.

According to a further aspect of the present invention there is provided a method of evacuating material, such as fluid from a pipeline, the method comprising driving an evacuating device substantially as described in any of the preceding seven paragraphs down a pipeline containing material to be removed, the driving force being sufficient to cause the second, deformable portion of the device to be compressed between said driving force and the reactive force of the material in the pipeline to deform to form a substantially sliding seal on the inside of the pipeline and move the device along the pipeline to force fluid before the device along the pipeline for removal.

The driving force may be provided by pressurised air supplied into the pipeline behind the device. Alternatively or additionally the driving force may be provided by pressurised liquid, such as a cleaning liquid.

According to a still further aspect of the present invention there is provided a method of manufacture of a pipeline evacuating device substantially as hereinbefore described, the method comprising moulding a first rigid portion adjacent a second relatively deformable portion, curing the portions together, encasing the portions in a protective sheath and curing the sheath on the portions.

BRIEF DESCRIPTION OF THE DRAWINGS

Curing may be effected by heat treatment. Magnetic and/or magnetizable additive(s) may be added to the first portion when in a pre-moulded liquid state, which additive (s) at least contribute to the relative rigidity of the first portion.

An embodiment of the present invention will now be described by way of example only, with reference to the accompanying drawings in which.

DETAILED DESCRIPTION

Figure 2:
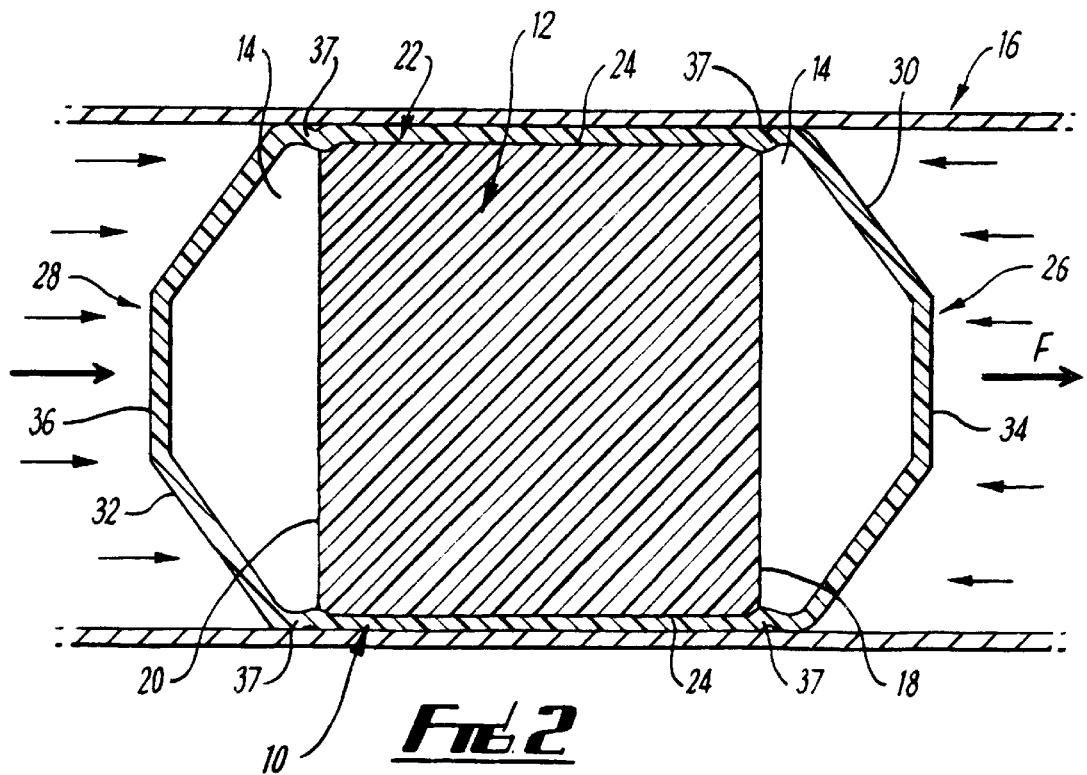
FIG. 2 is a diagrammatic cross-section of the device of FIG. 1 in use in a pipeline in accordance with the present invention.

With reference to the drawings a pipeline evacuating device 10, hereinafter termed a pig, comprises a first relatively rigid portion 12 and a second relatively deformable portion 14 arranged to be compressable against the rigid portion 12 when the device 10 is forced through a pipeline 16 containing fluid F (FIGS. 2 and 3) to be removed, by the reaction of the fluid F against the forced movement of the device 10 along the pipeline 16, the compression causing the second portion 14 to deform to at least substantially slidingly seal against the inside of the pipeline 16 whereby to provide efficient evacuation of the fluid F from the pipeline as the device 10 is forced therealong.

In more detail, the rigid portion 12 is located generally centrally in the generally elongate pig 10. The relatively rigid portion 12 comprises a plastics material in which is dispersed a magnetic or magnetizable material, such as strontium ferrate. At either end 18,20 of the rigid portion 12 is a relatively deformable portion 14. Each deformable portion 14 comprises the same or similar plastics material to that of the rigid portion 12, but does not comprise any magnetic or magnetizable additives. Upon curing (as described later) the rigid portion 12 and the respective deformable portions 14 bond together.

A generally cylindrical outer protective sheath 22 encases the portions 12,14, and is of plastics material again the same or similar to that of the portions 12,14, such that upon curing, the device is essentially as integral unit.

Figure 1:
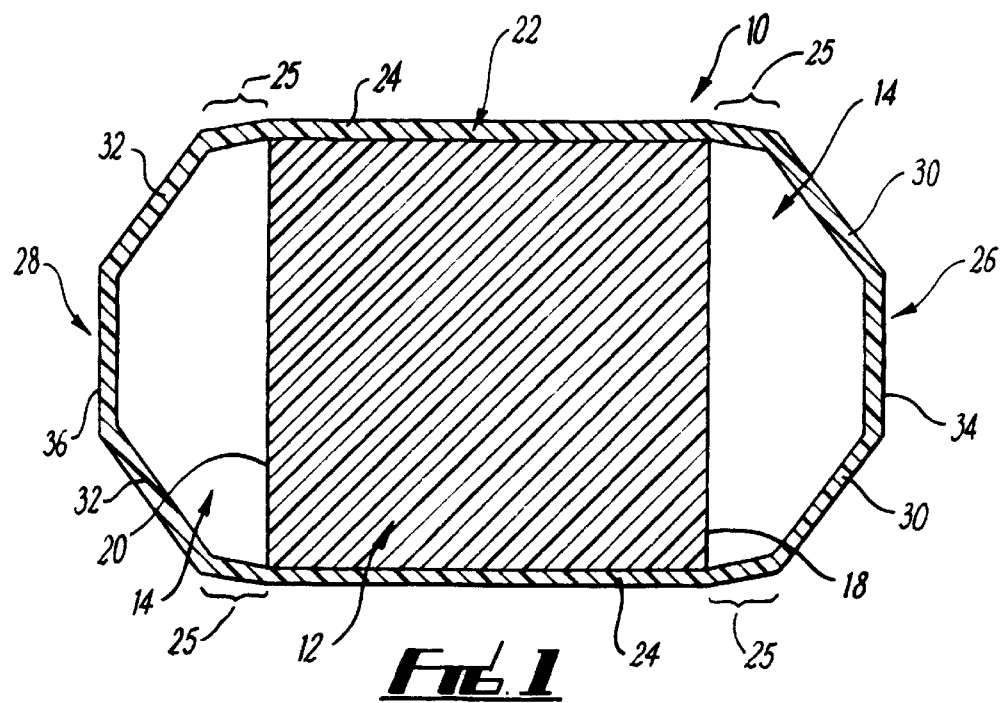
FIG. 1 is a diagrammatic cross-section of a pipeline evacuating device according to the present invention.

In its natural, relaxed condition, the pig 10 is of generally cylindrical configuration, as shown in FIG. 1, having a substantially straight longitudinal cylindrical portion 24 principally defined by the rigid portion 12 but which is defined at its ends by a part 25 of the respective deformable portions 14. The parts 25 are slightly tapered to give the device a slightly belled shape. The pig 10 tapers at each end 26,28 along a respective frusto conical surface 30,32 extending from the ends of the cylindrical portion 24 toward a respective end surface 34,36 which surfaces are both generally perpendicular to the longitudinal axis of the pig 10.

It is important that the cylindrical portion 24 of the pig 10 is defined at its ends by a part 25 of the respective deformable portions 14 for efficient function of the pig 10 as these parts 25 form, in use, the seal against the inside of a pipeline as will be described.

As mentioned above, the material of manufacture of the portions 12,14 and the outer sheath 22 are the same or of the same chemical family. The plastics material for the rigid portion 12 is mixed with a magnetic or magnetizable additive such as strontium ferrate. The plastics material making up the respective deformable portions 14 does not comprising any such additive. The respective portions 12,14 are moulded and cured by heating. The curing process bonds the portions 12,14 together. The flexible outer sheath 22 which may comprise additives to increase its protective qualities is then located around the portions 12,14. The pig 10 is then further heated to bond the sheath 22 and portions 12,14 together.

Once the pig 10 has been moulded, it is placed in a magnetic field, such as that produced by an electrical coil (not shown). The magnetic field is of sufficient strength to induce the desired permanent magnetic characteristics in the rigid portion 12 of the pig which magnetic characteristics enable detection of the location of the pig 10 in a pipeline 16 with appropriate detecting apparatus. Of course the deformable portions 12,14 comprise no magnetic additives and are therefore non-magnetic and remain relatively soft and deformable.

In use, a pig 10 according to the present invention is used to evacuate fluid, and usually liquid, from within a pipeline 16. The material evacuated is often a product of an industrial process, and efficient removal of residual product in a pipeline provides for more economical industrial processes. Further, efficient evacuation of product from pipelines provides for more efficient cleaning of that pipeline for subsequent use.

Figure 3:
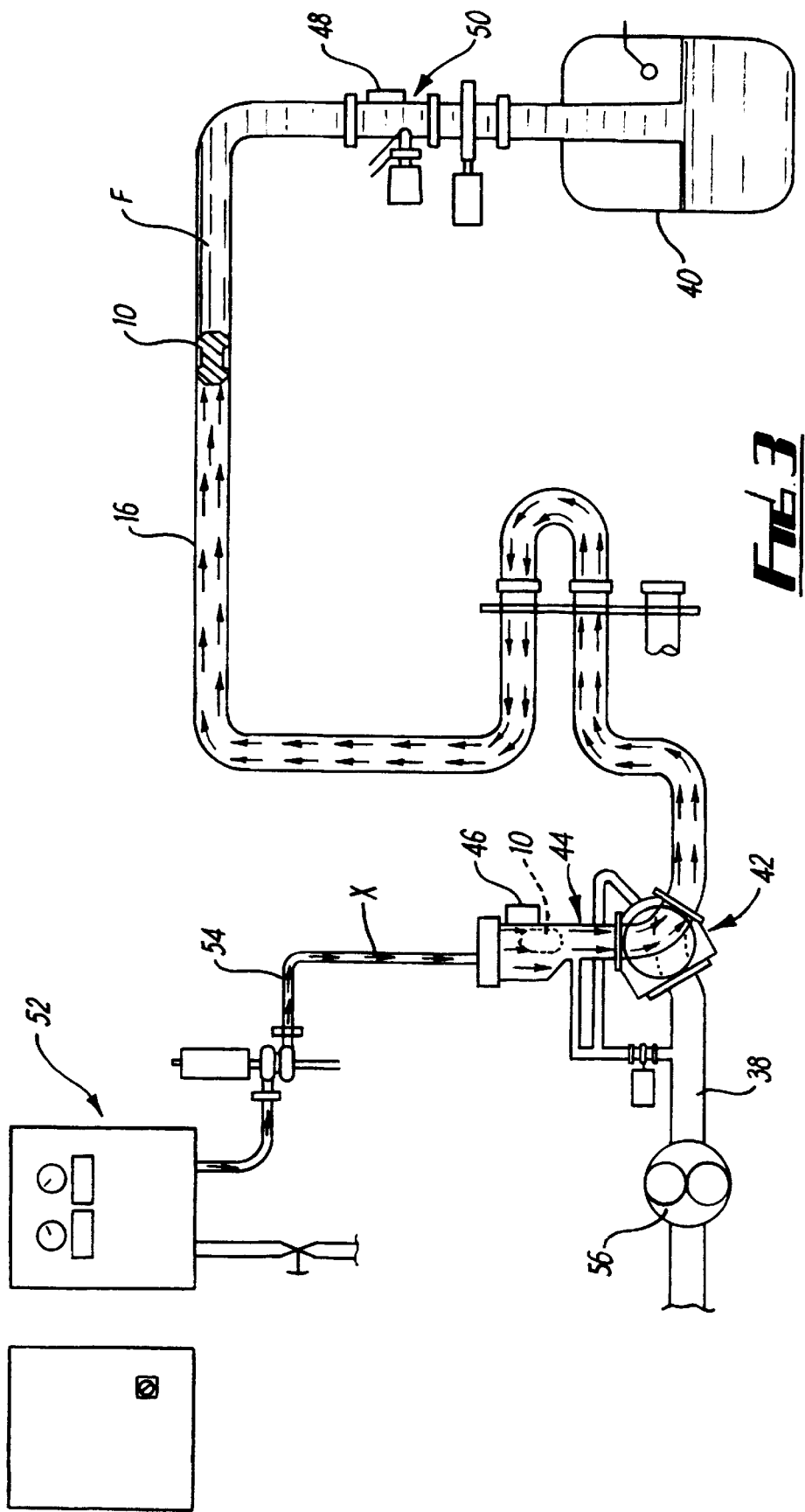
FIG. 3 is a diagrammatic representation of a pipeline system being evacuated by the device of FIG. 1.

Referring to FIG. 3 in particular, a pig 10 is shown in use evacuating a pipeline 16 of liquid material F. The pipeline 16 is normally used to convey liquid material F (which for the purpose of illustration only will be considered to be a liquid product that is being heat treated in the pipeline 16) from an inlet conduit 38 which supplies the product F from downstream, to a receptacle 40. A valve arrangement 42 is provided at the intersection of the inlet conduit 38, the entrance to the pipeline 16 and a pig storage housing 44. Pig detecting means 46,48 are provided to detect the presence or absence of a pig 10 in the storage housing 44 and at the output end 50 of the pipeline 16, respectively. Heating means (not shown) is provided to heat treat the liquid F in the pipeline, for example to pasteurise it.

A propellant fluid source 52, such as a compressed air generator or pressurised cleaning liquid source, is connected via a conduit 54 to the storage housing 44 for selective supply of propellant fluid thereto to drive a pig 10 located in the housing 44 down the pipeline 16 as will be described.

During normal operation of the pipeline 16, the valve arrangement 42 connects the inlet conduit 38 to the pipeline 16 to allow the flow of liquid F pumped by the pump 56 from the conduit 38 along the pipeline 16. With the valve arrangement 42 in this condition (as shown in dotted outline in FIG. 3), the storage housing 44 comprising a pig 10 (as shown in dotted outline) is isolated from the pipeline 16 and the propellant fluid source is de-activated.

In this example, the liquid F is pasteurised and it is pumped along the pipeline. Of course it is not relevant to the present invention what treatment, if any, is given to fluid in the pipeline prior to evacuation.

Upon completion of a production run for the liquid F, the pump 56 is deactivated and the valve arrangement 42 turned to the position shown in FIG. 3 wherein the conduit 38 is isolated from the pipeline 16, and the storage housing 44 is placed in communication with the pipeline 16.

The propellant fluid source 52 is then activated, and pressurised propellant fluid (indicated by the arrows X) is forced down the conduit 54 into the housing 44 wherein it acts upon the pig 10 to drive it down, through the valve arrangement 42 and along the pipeline 16.

As the force of the propellant fluid acts on the pig 10 (as shown diagrammatically in FIG. 2) to force it along the pipeline 16 to thereby drive the fluid F in the pipeline out through the output end 50, the reaction or resistance of the fluid F to such movement acts on the leading end 26, and particularly against the surface 34 and thereby compresses the relatively soft leading deformable portion 14 against the relatively rigid portion 12, to cause the deformable portion 14 to bell out or expand particularly in the region of the parts 25 in a lateral direction to form a sealing collar 37 that presses against the inside surface of the pipeline 16 to provide a slidable seal thereagainst. The sealing collar 37 presses against the inside of the surface harder than the relatively non-deformable parts of the device 10.

Similarly at the rear end 28, the force of the propellant fluid on the end 28 and particularly the surface 36 compresses the deformable portion 14 against the rigid portion 12 to cause the rear deformable portion 14 to bell out to form a sealing collar 37 which presses against the inner surface of the pipeline 16 to provide a second, slidable seal against the inside of the inside of the pipeline 16. The force of the propellant fluid F is sufficient to drive the pig 10 in this deformed condition along the pipeline 16, with the respective compressed portions 12 dragging along the inner surface of the pipeline 16, thereby ensuring that little or no residue of liquid F is left behind the pig 10 and hence providing efficient evacuation of fluid F from the pipeline 16. The propellant fluid F may be cleaning fluid which further cleans, particularly on a microbial level, the inside of the pipeline 12 following the movement of the pig 10 along the pipeline.

It will be appreciated that the relative softness of the deformable portions 14 allows the respective portions 14 to further deform to enable the pig 10 to move around bends and the like in the pipeline 16. The rigid portion 12 is necessarily spaced from the inside of the pipeline 16 sufficiently to provide movement around bends.

Further, because the external diameter of the pig 10 is sufficiently less than the internal diameter of the pipeline in which it is intended for use, the pig 10 is readily launched into a pipeline for use.

As mentioned above, the magnetic characteristics of the rigid portion 12 enable the position of the pig 12 in the pipeline 16 to be determined, and once the pig 10 reaches the end 50 of the pipeline 16, the second detector 48 signals this, and the propellant fluid source can be de-activated. The fluid F evacuated from the pipeline 16 is collected in the receptacle 40 for use or disposal as appropriate.

It will be appreciated that the pig 10 according to the present invention provides for more efficient evacuation and cleaning of pipelines 16 than is provided by conventional designs of pig, and the pig 10 could be used to evacuate gases from pipelines 16 as well liquids under appropriate conditions.

Various modifications may be made without departing from the scope of the present invention. For example the rigid portion may be non-magnetic/non-magnetizable.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. A pipeline evacuating device comprising:
   a first portion; and
   a second portion, the first portion being rigid as compared to the second portion, and the second portion being deformable as compared with the first portion;
   said second portion being compressable against the first portion when a force is applied thereto, whereby when the device is forced along a pipeline compression of the second portion against the first portion deforms the second portion to bell out to slidingly seal the second portion against the inside of the pipeline.

2. A device according to claim 1 wherein the second portion is resiliently deformable such that upon removal from pressurized conditions the device returns to a non-compressed, relaxed condition.

3. A device according to claim 1 wherein the second portion is arranged to be compressable to increase the relaxed width of the second portion in a direction transverse to the intended direction of movement of the device in use along a pipeline.

4. A device according to claim 1 wherein the second portion is deformable substantially symmetrically, to form a seal around the device to provide for substantially complete slidable sealing around the device in a pipeline.

5. A device according to any of claim 1 wherein the seal is in the form of a sealing collar.

6. A device according to claim 1 wherein the force exerted onto the pipeline by the second portion is greater than the force exerted by the first portion.

7. A device according to claim 1 wherein the second portion extends substantially across the width of the first portion, to provide for a sealing collar towards one end of the first portion.

8. A device according to claim 1 wherein the second, deformable portion is located on the one end which in use leads the device to provide for compression of the second portion between the fluid in the pipeline to be removed and the first portion.

9. A device according to claim 8 wherein the device tapers at said one leading end.

10. A device according to claim 9 wherein the leading end comprises a surface transverse to the direction of movement of the device on which the reactive forces of the material act in use.

11. A device according to claim 1 wherein the devices is elongate, and operable in the longitudinal direction.

12. A device according to claim 1 wherein the first portion is magnetic and/or magnetizable to facilitate detection of the location of the device in a pipeline.

13. A device according to claim 12 wherein the first portion comprises the same or similar material as the second deformable portion.

14. A device according to claim 12 wherein the first portion comprises plastics material and with at least one magnetic or magnetizable additive therein, wherein each additive contributes to the relative rigidity of the first portion.

15. A device according to claim 14 wherein each additive is metallic or metal compounds perhaps in powder and/or granular form.

16. A device according to claim 1 wherein the first portion is of greater diameter than the second portion when the device is in the relaxed condition.

17. A device according to claim 1 wherein the second portion is firmly attached to the first portion, and is fused, and/or chemically bonded, thereto.

18. A device according to claim 1 wherein the first and second portions are encased in a flexible outer sheath which sheath is relatively tough to provide protection of the first and second portions.

19. A device according to claim 1 comprising a further deformable portion which further portion is arranged to be compressable along with the said deformable portion to provide a second slidable seal.

20. A device according to claim 19 wherein the further deformable portion is provided at the other, rear end of the device to be deformable through compression between the means providing the force for movement of the device and the relatively rigid portion.

21. A device according to claim 19 wherein the further deformable portion is similar to the said second portion.

22. A device according to claim 1 wherein the device is substantially symmetrical.

23. A device according to claim 1 wherein the device is bidirectionally operable.

24. A method of evacuating material, comprising driving an evacuating device substantially as claimed in claim 1 down a pipeline containing material to be removed, the driving force being sufficient to cause the second, deformable portion of the device to be compressed between said driving force and the reactive force of the material in the pipeline to deform to form a substantially sliding seal on the inside of the pipeline and move the device along the pipeline to force fluid before the device along the pipeline for removal.

25. A method according to claim 24, wherein the driving force is provided by pressurised air supplied into the pipeline behind the device.

26. A method according to claim 24 wherein alternatively or additionally the driving force is provided by pressurised liquid.

27. A method of manufacture of a pipeline evacuating device according to claim 24 comprising moulding a first rigid portion adjacent a second relatively deformable portion, curing the portions together, encasing the portions in a protective sheath and curing the sheath on the portions.

28. A method according to claim 27, wherein curing is effected by heat treatment.

29. A method according to claim 27, wherein magnetic and/or magnetizable additive(s) are added to the first portion when in a pre-moulded liquid state, which additive(s) at least contribute to the relative rigidity of the first portion.

30. An assembly comprising a pipeline and a pipeline evacuating device as claimed in claim 1.

* * * * *